(12) United States Patent
Tada et al.

(10) Patent No.: US 6,212,186 B1
(45) Date of Patent: Apr. 3, 2001

(54) CELL BANDWIDTH CONTROL APPARATUS

(75) Inventors: Iwao Tada; Jyoei Kamoi; Tomoyuki Yamaguchi; Naoki Aihara, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/979,431

(22) Filed: Nov. 26, 1997

(30) Foreign Application Priority Data

Mar. 19, 1997 (JP) .................................................. 9-065990

(51) Int. Cl.⁷ .................................................. H04L 12/56
(52) U.S. Cl. .......................... 370/395; 370/466; 370/468; 370/477
(58) Field of Search .................................. 370/465, 477, 370/521, 528, 252, 466, 395, 468

(56) References Cited

U.S. PATENT DOCUMENTS

| | | | |
|---|---|---|---|
| 5,642,421 | * 6/1997 | Gray et al. | 380/49 |
| 5,663,959 | * 9/1997 | Nakagawa | 370/395 |
| 5,799,003 | * 8/1998 | Fujimaki et al. | 370/528 |

OTHER PUBLICATIONS

Plural–Line Terminating Apparatus and OAM Processing Drawings Figs 1–23 U.S. Pending Application No. 924,052, Filed on Aug. 28, 1997.

Cell Bandwidth Control Apparatus Drawings Figs 1–11 U.S. Pending Application No. 08/979,431 filed on Nov. 26, 1997.

* cited by examiner

*Primary Examiner*—Ricky Ngo
(74) *Attorney, Agent, or Firm*—Helfgott & Karas, P.C.

(57) ABSTRACT

The invention concerns an ATM exchange, and is directed in particular to the provision of a cell bandwidth control apparatus for performing bandwidth control for ATM cells sent from the ATM exchange onto the line side. The cell bandwidth control apparatus includes forced empty cell inserting means for forcibly inserting empty cells in a highway connected to an ATM switch. The forced empty cell inserting means inserts forced empty cells in an outgoing highway leading from the ATM switch to a line adapter and thereby limits the line bandwidth of the outgoing highway to within the bandwidth of the line accommodated in the line adapter.

19 Claims, 11 Drawing Sheets

*)TAGE---- FOR FORCED EMPTY CELL

E = (SIGNAL INDICATING FORCED EMPTY CELL)
INVALID CELL (SEPARATE LINE)

CELL BANDWIDTH CONTROL APPARATUS

BACKGROUND OF THE INVENTION

1. Field of the Invention

The present invention relates to an ATM (Asynchronous Transfer Mode) exchange, and more particularly to a cell bandwidth control apparatus for performing bandwidth control for ATM cells sent from the ATM exchange onto the line side.

2. Description of the Related Art

In an ATM exchange, a plurality of line adapters are connected to an ATM switch. ATM cells are input to the ATM exchange by payloads incoming from lines operating at various speeds; generally, the internal circuitry of the ATM exchange accommodating the lines is operating at a speed different from the speeds of the lines, and its operating speed is higher than the operating speeds of the lines.

Data formatted, for example, to SONET (Synchronous Optical Network), DS3, or other specifications, is input from the line side to the line adapter. The line adapter removes the overhead (OH), header, etc. of the data, extracts ATM cells carried in the payload, and sends the ATM cells to the ATM switch after converting each cell into an ATM switching cell with an internal routing tag appended thereto. Conversely, for ATM cells input to the line adapter from the ATM switch, the line adapter removes the ATM switching tag from each ATM cell, and maps the cells into the payload applicable on the line side, and sends them out onto the line side after appending the overhead, header, etc. of SONET, DS3, etc.

In this way, since the overhead (OH), header, etc. of SONET, DS3, etc. are appended when outputting an ATM signal from the line adapter onto the line side, the effective bandwidth for an outgoing highway signal that can be carried in the payload on the line side, i.e., the combined signal of user cells, OAM (Operations, Administration, and Maintenance) information cells for higher layers, etc., is 149.76 Mbits/s.

When the bandwidth of 149.76 Mbits/s is fully used, and OAM cells, for example, are inserted in the remaining bandwidth of 5.16 Mbits/s (155.52 Mbits/s−149.76 Mbits/s=5.76 Mbits/s) at the ATM exchange, a problem arises in that the bandwidth increases correspondingly and data equivalent to the bandwidth of the inserted OAM cells is discarded at the line side regardless of the type of cell, whether a user cell or an OAM cell.

SUMMARY OF THE INVENTION

In view of the above problem, it is an object of the present invention to provide a cell bandwidth control apparatus for an ATM exchange, that forcibly inserts empty cells within a bandwidth where signals cannot be sent from the ATM exchange to the line side (hereinafter referred to as the out-of-band area), for example, the above-noted 5.76-Mbit/s bandwidth, and thereby limits the transmission bandwidth available for transmission from the ATM exchange to the line side to the bandwidth where signals can be sent from the ATM exchange to the line side (hereinafter referred to as the line bandwidth), for example, the above-noted 149.76-Mbit/s bandwidth.

It is also an object of the present invention to provide a cell bandwidth control apparatus for use in ATM communications, that can be applied not only when performing transmissions between the ATM exchange and the line side, as described above, but also when performing ATM communications between apparatuses with different line bandwidths.

The present invention thus prevents important cells, such as user cells, from being discarded.

According to the present invention, there is provided a cell bandwidth control apparatus for performing bandwidth control for ATM cells sent from an ATM exchange out on a line side, comprising forced empty cell inserting means for forcibly inserting an empty cell in a highway connected to an ATM switch, wherein with the forced empty cell inserting means inserting a forced empty cell in an outgoing highway leading from the ATM switch to a line adapter, the line bandwidth of the outgoing highway is limited to within the bandwidth of the line accommodated in the line adapter.

The line bandwidth of the outgoing highway is limited to within the bandwidth of the line before an OAM cell is inserted in the outgoing highway. The forced empty cell carries a prescribed forced empty cell indication flag in a tag which is appended to each ATM cell to control the ATM cell within the ATM exchange, and the forced empty cell is distinguished from other cells by the forced empty cell indication flag. Alternatively, the cell bandwidth control apparatus includes a separate line for forced empty cell identification, which is provided separately from the forced empty cell, and the forced empty cell is distinguished from other cells by a forced empty cell identification signal from the separate line.

The cell bandwidth control apparatus further comprises a forced empty cell filtering device for detecting only a forced empty cell on the outgoing highway, wherein the forced empty cell detected by the forced empty cell filtering device is directly looped back by the forced empty cell inserting means for insertion into an incoming highway leading from the line adapter to the ATM switch, thereby limiting the line bandwidth of the incoming highway to within the bandwidth of the line accommodated in the line adapter.

The cell bandwidth control apparatus further comprises a counter for counting the number of forced empty cells detected on the outgoing highway by the forced empty cell filtering device, wherein the forced empty cell inserting means successively inserts forced empty cells in the number counted by the counter into the incoming highway rather than directly looping back the detected forced empty cells on the outgoing highway for insertion into the incoming highway.

The cell bandwidth control apparatus includes test cell inserting means for mapping test data into a payload area of the forced empty cell, thereby providing the forced empty cell with a line test function. Further, when the line adapter is multiplexed to accommodate a plurality of lines on a single highway, the cell bandwidth control apparatus includes a line identification number device for adding a line identification number within the tag, which is appended to each ATM cell to control the ATM cell within the ATM exchange, wherein control for forced empty cell insertion is carried out for each of the lines by the line identification number device.

According to the present invention, the cell bandwidth control apparatus for limiting the communication bandwidth in ATM communications between ATM communication apparatuses having different communication bandwidths, is provided at the ATM communication apparatus having the larger communication bandwidth, and empty cells are forcefully inserted within a difference bandwidth between the larger communication bandwidth and the communication bandwidth of the ATM communication apparatus having the smaller communication bandwidth so that the former bandwidth is held to within the latter bandwidth, thereby limiting the communication bandwidth of the larger communication bandwidth ATM communication apparatus.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before proceeding to the description of the preferred embodiments of the present invention, the related art will be described first with reference to drawings.

Figure 1A:
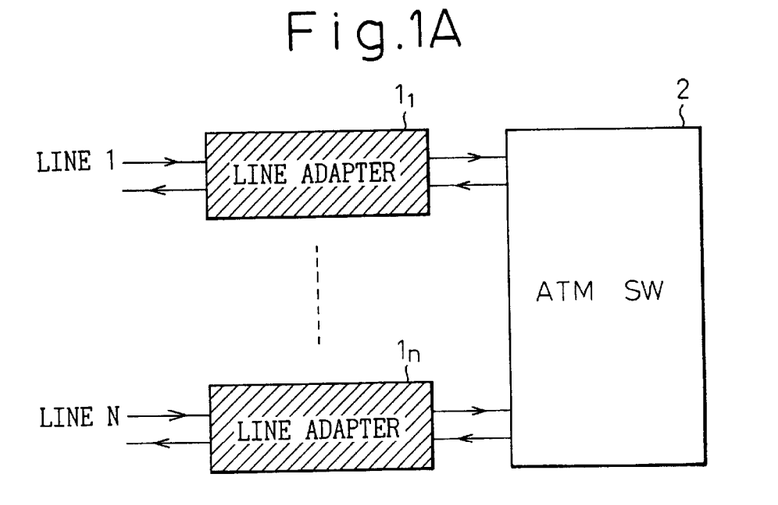
FIG. 1A is a diagram showing a configurational example (1) of an ATM switch in an ATM exchange and line adapters accommodated therein.

FIG. 1A is a block diagram showing an ATM switch/line adapter arrangement in an ATM exchange.

FIG. 1A shows an ATM switch 2 in an ATM exchange and a plurality of line adapters $1_1$ to $1_n$ connected to the ATM switch 2. ATM cells are input to the ATM exchange by payloads incoming from lines operating at various speeds.

Figure 1B:
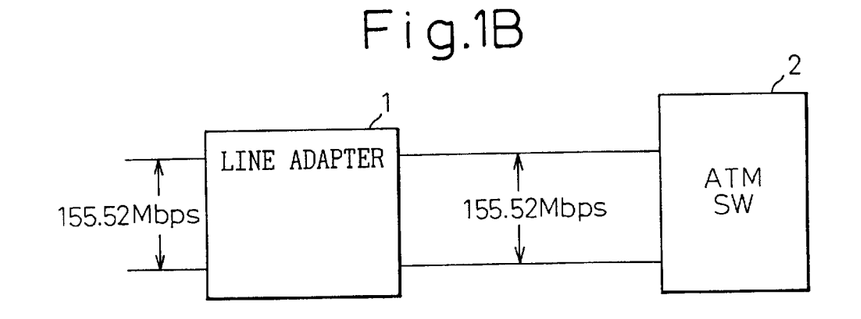
FIG. 1B is a diagram showing a configurational example of the ATM switch of FIG. 1A and one line of the line adapters accommodated therein.

For example, data formatted to SONET (Synchronous Optical Network), DS3, or other specifications, is input from the line side to the line adapter 1 shown in FIG. 1B. In the line adapters $1_1$ to $1_n$, the overhead (OH), header, etc. of the data are removed to extract ATM cells, and the extracted ATM cells are converted into ATM switching cells with the tag described later attached thereto, which are then sent on to the ATM switch 2. Conversely, when data is input to the line adapters $1_1$ to $1_n$ from the ATM switch 2, the line adapters $1_1$ to $1_n$ remove the tag appended for ATM switching, insert the data into the payload applicable at the line side, and send it out on the line side after appending the overhead, header, etc. of SONET, DS3, etc.

FIG. 1B shows one line in FIG. 1A, illustrating an example in which the highway (HW) between the line adapter 1 and the ATM switch 2 in the ATM exchange and the interface between the line adapter 1 and the line side are both running at a basic bit rate of 155.52 Mbits/s.

Figure 2A:
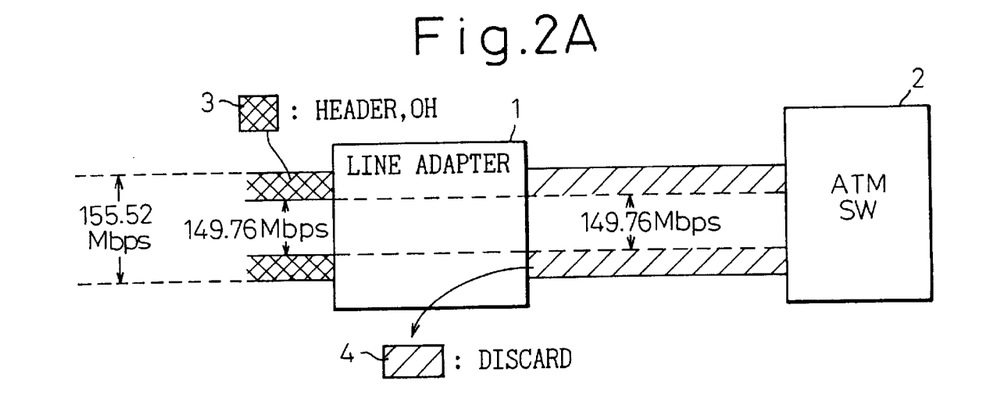
FIG. 2A is a diagram showing a transmission bandwidth for ATM cells in FIG. 1B.

FIG. 2A shows an effective transmission bandwidth for ATM cells in FIG. 1B.

As noted above, the highway between the line adapter 1 and the ATM switch 2 and the interface between the line adapter and the line side both have a bandwidth of 155.52 Mbits/s. In practice, however, when outputting an ATM signal from the line adapter 1 onto the line side, overhead (OH), header, etc. corresponding to the signal format of the line side are appended, and the effective bandwidth for an outgoing signal that can be carried in the payload area of the line side signal, i.e., the combined signal of user cells, signaling cells, OAM (Operations, Administration, and Maintenance) information cells for the ATM and higher layers excluding OAM information for the physical layer, etc., is limited to 149.76 Mbits/s as shown at the line side in FIG. 2A.

Figure 2B:
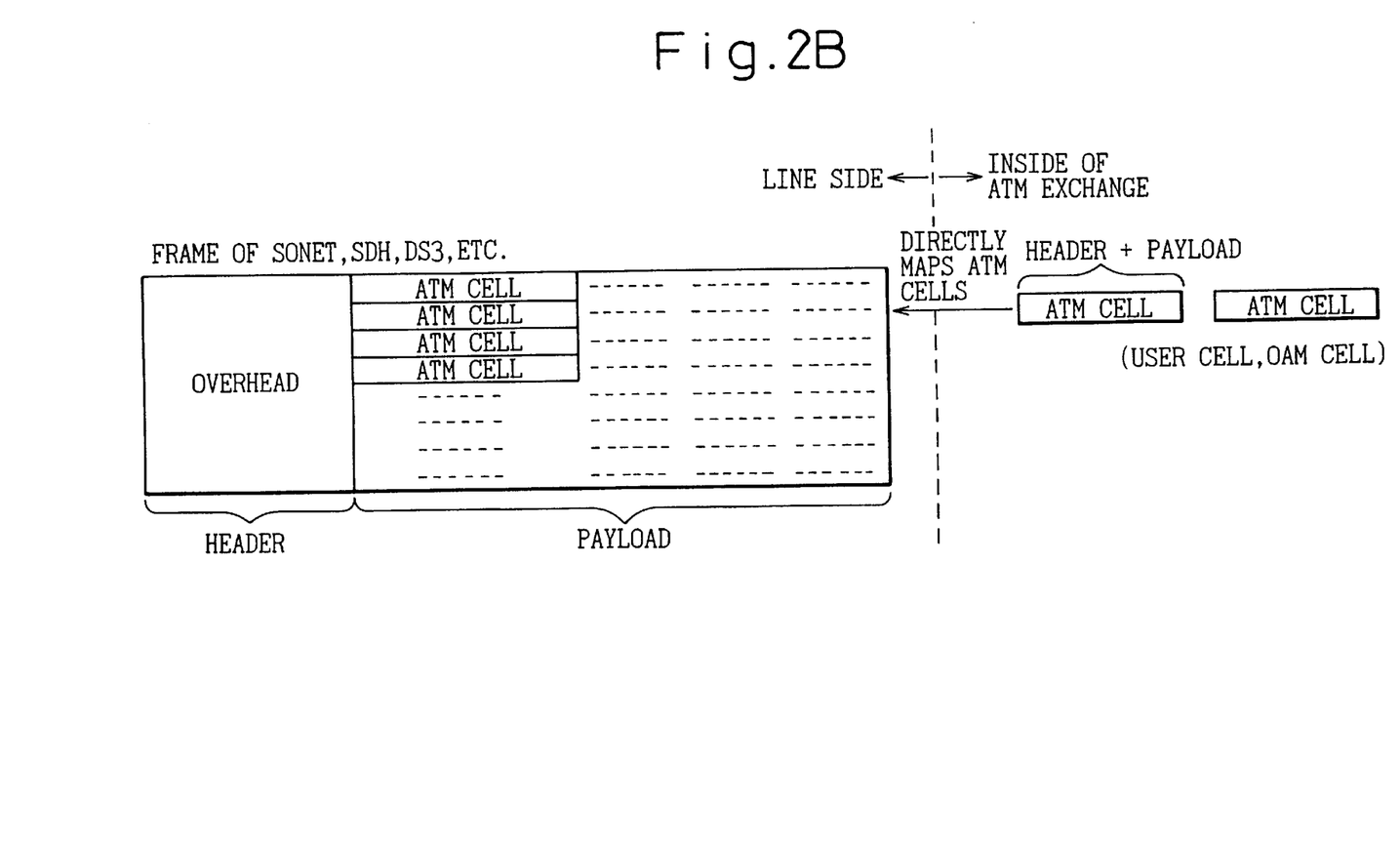
FIG. 2B is a diagram showing an example of cell transmission in FIG. 2A.

FIG. 2B shows an example of ATM cell transmission in FIG. 2A.

As shown in FIG. 2B, user cells, OAM cells, etc. from the ATM exchange are sequentially stored in the payload area of a SONET, SDH, DS3 or other signal applicable at the line side, and sent out on the line side after appending its corresponding header signal. As a result, the transmission bandwidth for the payload area, that is, the effective bandwidth inside the ATM exchange, is limited to the line side bandwidth (155.52 Mbits/s) minus the bandwidth of the header signal, i.e., to 149.76 Mbits/s.

Accordingly, when the effective bandwidth of 149.76 Mbits/s is fully used at the line side, if OAM cells, etc. are further inserted in the remaining bandwidth of 5.76 Mbits/s (155.52 Mbits/s–149.76 Mbits/s=5.76 Mbits/s) shown by oblique hatching at the ATM exchange, there arises the problem that user cells or OAM cells (represented by cell 4 in FIG. 2A) from the ATM exchange are discarded in an amount equivalent to the added cells.

The present invention that overcomes the above problem will now be described below.

Figure 3:
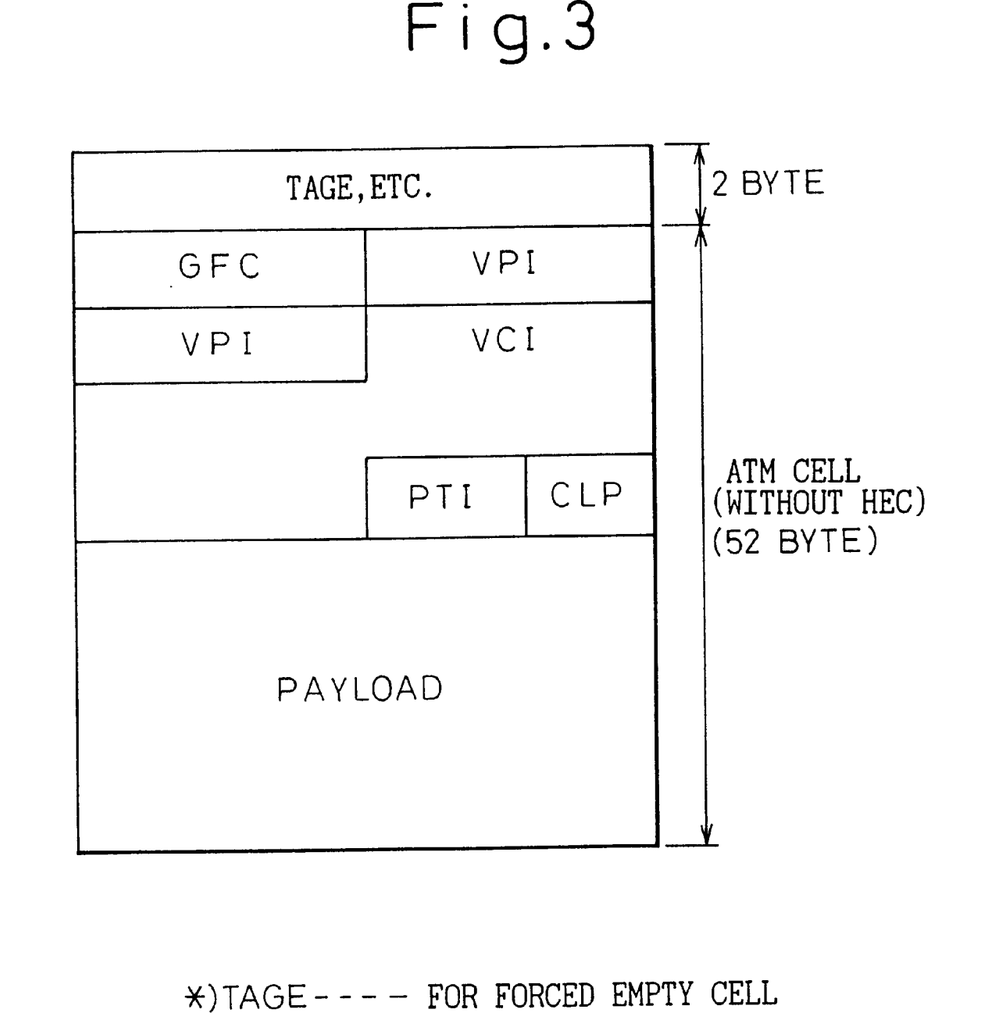
FIG. 3 is a diagram showing an example of a forced empty cell format according to the present invention.

FIG. 3 shows one example of a forced empty cell format used in the present invention.

The example of FIG. 3 shows an ATM cell having a UNI (User Network Interface) header structure (without HEC); that is, an example of a forced empty cell is shown in which a two-byte tag used only within the ATM exchange is carried in its header field. Generally, the tag is used for route identification within the exchange for transmission of the ATM cell, or for a point-to-multipoint designation, etc. In the present invention, an "E" bit designating a forced empty cell is further added to the tag field.

Figure 4:
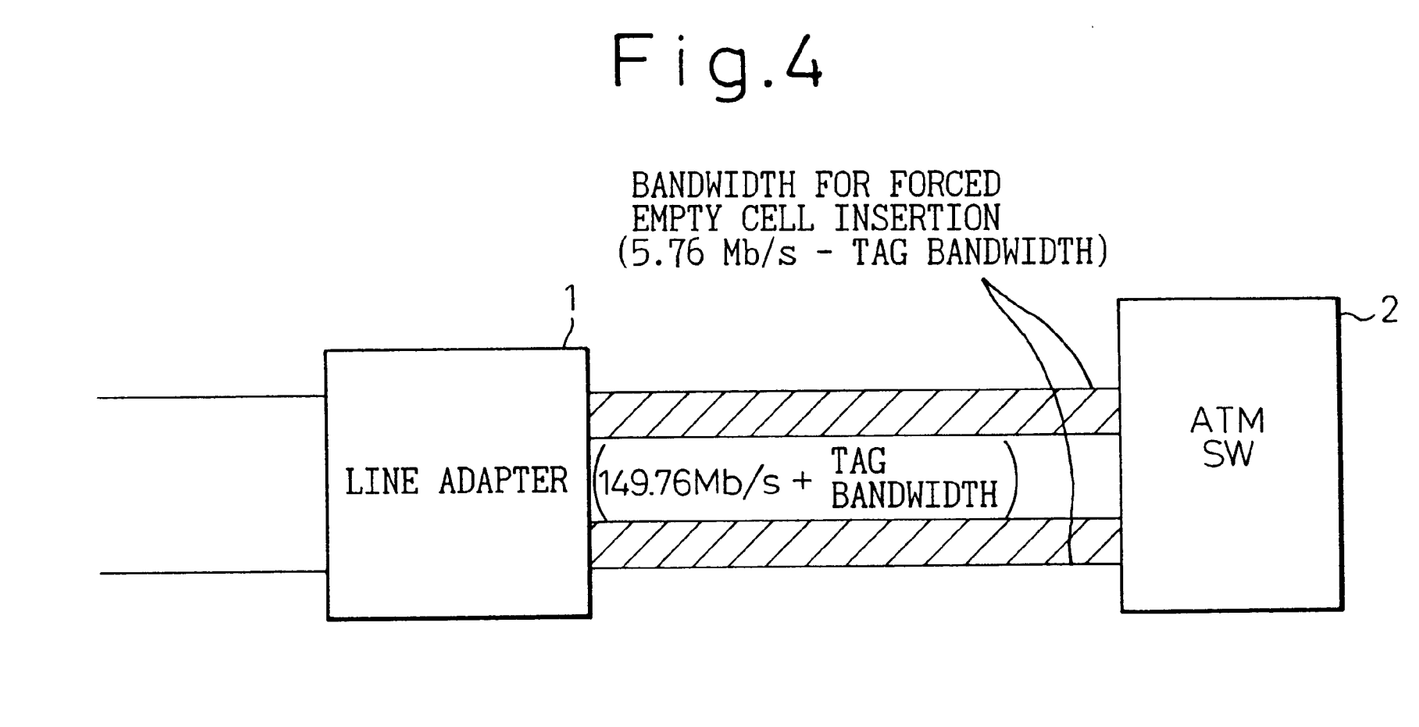
FIG. 4 is a diagram showing an example of a forced empty cell insertion band.

FIG. 4 schematically shots a bandwidth (indicated by oblique hatching) where the forced empty cell is inserted.

According to the present invention, the forced empty cell (E bit=1) shown in FIG. 3 is forcibly inserted within the 5.76-Mbit/s bandwidth (shown by oblique hatching in FIG.

2A) outside the line bandwidth. In practice, since the tag requiring two bytes per cell is used within the ATM exchange, the bandwidth of 5.76 Mbits/s minus the bandwidth for the tag is assigned to the forced empty cell (as shown by oblique hatching in FIG. 4).

Figure 5A:
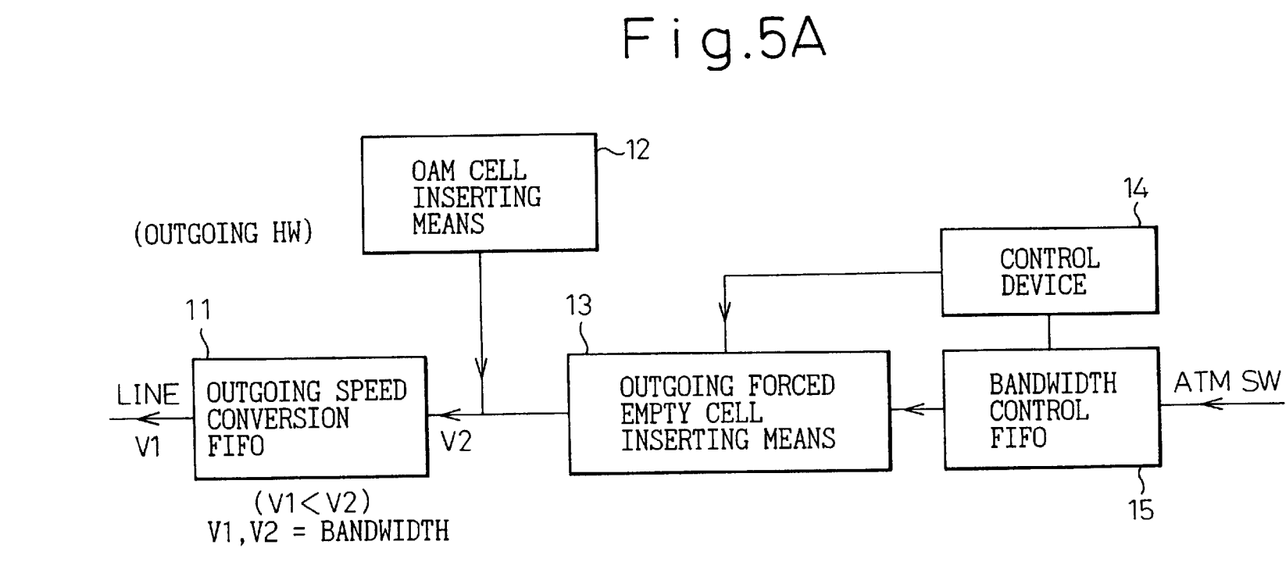
FIG. 5A is a diagram showing a cell bandwidth control apparatus according to a first embodiment of the present invention.

As a result, the 149.76 Mbits/s plus the tag bandwidth becomes the line bandwidth, but since the tag itself is terminated in the line adapter 1, the effective line bandwidth actually assigned to user cells, OAM cells, etc. remains at 149.16 Mbits/s, FIG. 5A shows a cell bandwidth control apparatus for inserting forced empty cells for bandwidth control according to a first embodiment of the present invention.

Figure 5B:
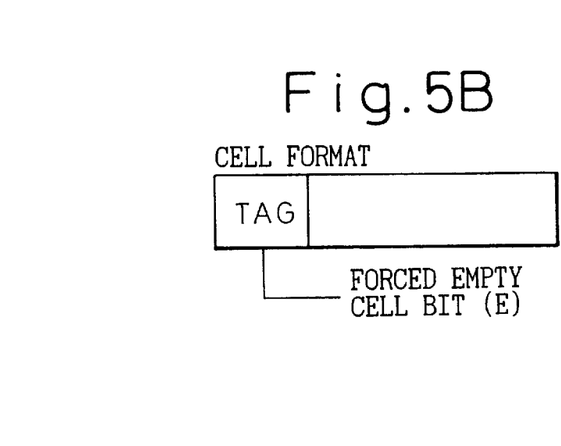
FIG. 5B is a diagram showing an example of a forced empty cell in FIG. 5A.

FIG. 5B shows an example of the forced empty cell used in FIG. 5A.

In any of the embodiments hereinafter shown, the cell bandwidth control apparatus of the present invention is implemented as one function of the line adapter 1. However, it will be appreciated that the cell bandwidth control apparatus of the present invention is not limited in application to the line adapter of the ATM exchange, but it can also be used in applications, for example, where between communication apparatuses with different line bandwidths, the line bandwidth of one or the other of the apparatuses is limited.

In FIG. 5A, a bandwidth control FIFO 15 adjusts the timing for forced empty cell insertion by temporarily storing outgoing highway signals from the ATM switch 2 in the order in which they are input. A central device 14 monitors the bandwidth control FIFO 15 and, based on the result of the monitoring, indicates the forced empty cell insertion timing to an outgoing forced empty cell inserting means 13. Based on the indication, the outgoing forced empty cell inserting means 13 generates and inserts a forced empty cell.

The outgoing forced empty cell inserting means 13 inserts a forced empty cell in a cell slot in the out-of-band area where no user cells, etc. for transmission are carried. When inserting a forced empty cell, the sendout timing for the forced empty cell is adjusted using the bandwidth control. FIFO 15, and the forced empty cell indication bit E in the tag field is set to 1. On the other hand, when there are user cells, etc. that should be read into the line bandwidth, such cells are sent out on the highway. At the line side, the empty cell is forcibly discarded by detecting the E bit.

FIG. 5B shows an ATM cell on the outgoing highway, with the tag appended thereto; when the cell is a forced empty cell, the E bit in the tag field is set to 1 (enable). The forced empty cell only carries the forced empty cell indication (E bit) in the tag field, plus information on line number and identifier. As the result of the forced empty cell insertion, the data bit rate of the outgoing highway is limited to less than the line bandwidth of 149.76 Mbits/s (in the example of FIG. 4, 149.76 Mbits–tag bandwidth).

Next, OAM cell inserting means 12 discards OAM cells when the line bandwidth is fully used, that is, when the full bandwidth of 155.52 Mbits/s, including the 5.76-Mbit/s bandwidth (in the example of FIG. 4, 5.76 Mbits/s–tag bandwidth) outside the line bandwidth and occupied by forced empty cells, is used, and inserts an OAM cell when there is an available bandwidth in the line bandwidth.

Accordingly, the OAM cell inserting means 12 does not insert OAM cells in the out-of-band area occupied by forced empty cells, eliminating the possibility of discarding user cells, etc. due to the use of OAM cells. Finally, outgoing speed conversion FIFO 11 adjusts the speed between line bandwidth V2 at the ATM exchange side and line bandwidth V1 (V1<V2) at the line side.

Figure 6:
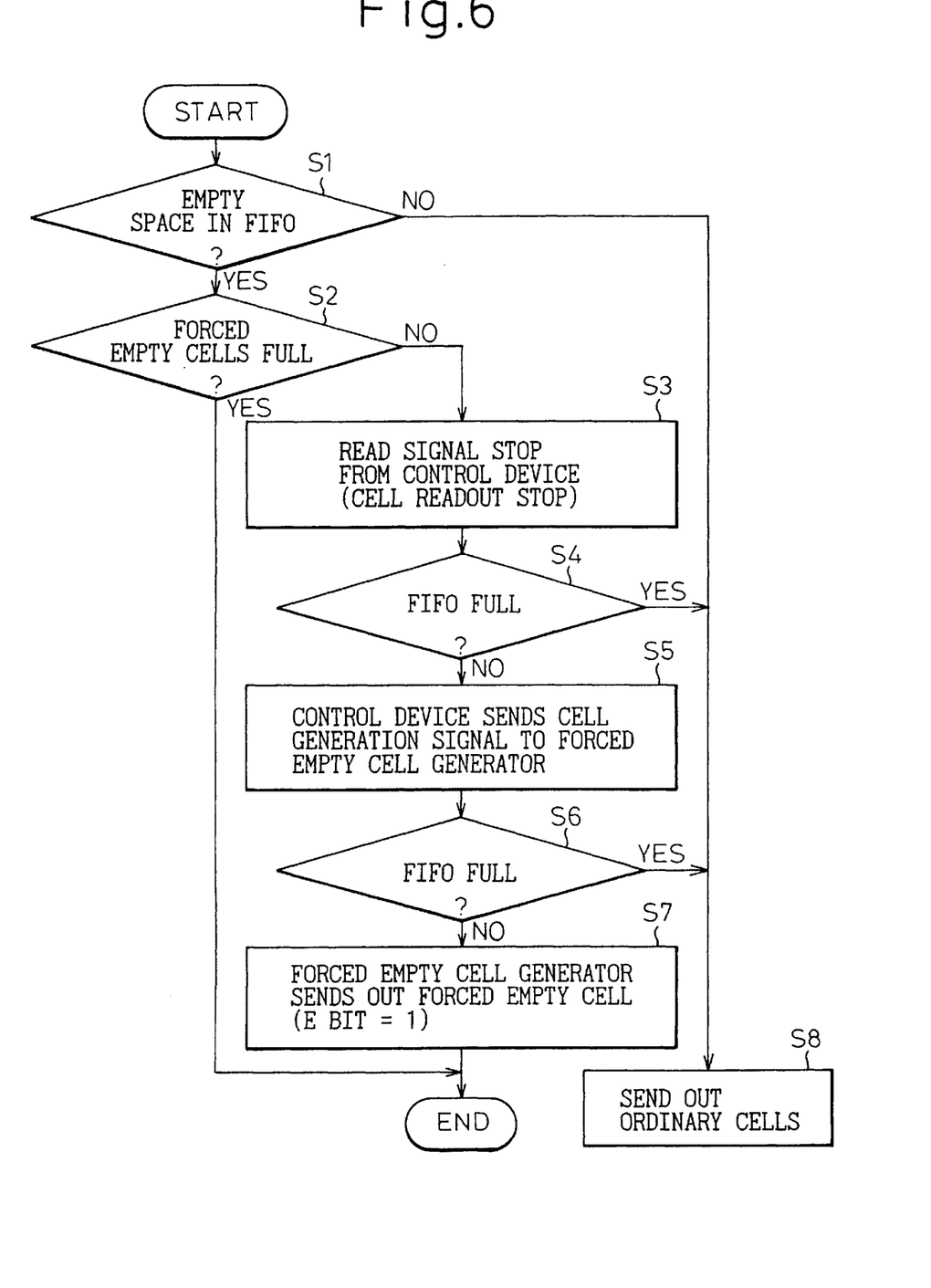
FIG. 6 is a diagram showing an example of a forced empty cell insertion flow.

FIG. 6 shows an example of a forced empty cell insertion flow.

First, the central device 14 detects in step S1 whether there is an empty space in the bandwidth control FIFO 15; if the FIFO 15 is full (NO), the bandwidth control FIFO 15 is caused to output ordinary user cells, etc. (S8). On the other hand, if there is an empty space (YES), then a decision is made as to whether forced empty cells are full (S2).

Forced empty cells being full means that an output count value for the forced empty cells has reached the maximum number of forced empty cells that can fit in the out-of-band area. If forced empty cells are full (YES), the flow is terminated since there is no need to send out any more forced empty cells. On the other hand, if the output count value for the forced empty cells has not yet reached the maximum number of forced empty cells that can fit in the out-of-band area (NO), the control device 14 instructs the bandwidth control FIFO 15 to stop sending out ordinary cells (stopping of cell readout) (S3).

After that, the control device 14 instructs the outgoing forced empty cell inserting means 13 to generate and send out a forced empty cell (S5, S7). In the meantime, the control device 14 checks to see whether the bandwidth control FIFO 15 is full (S4, S6), and if it becomes full, the outgoing forced empty cell inserting means 13 is instructed to give priority to ordinary cells (S8).

Figure 7A:
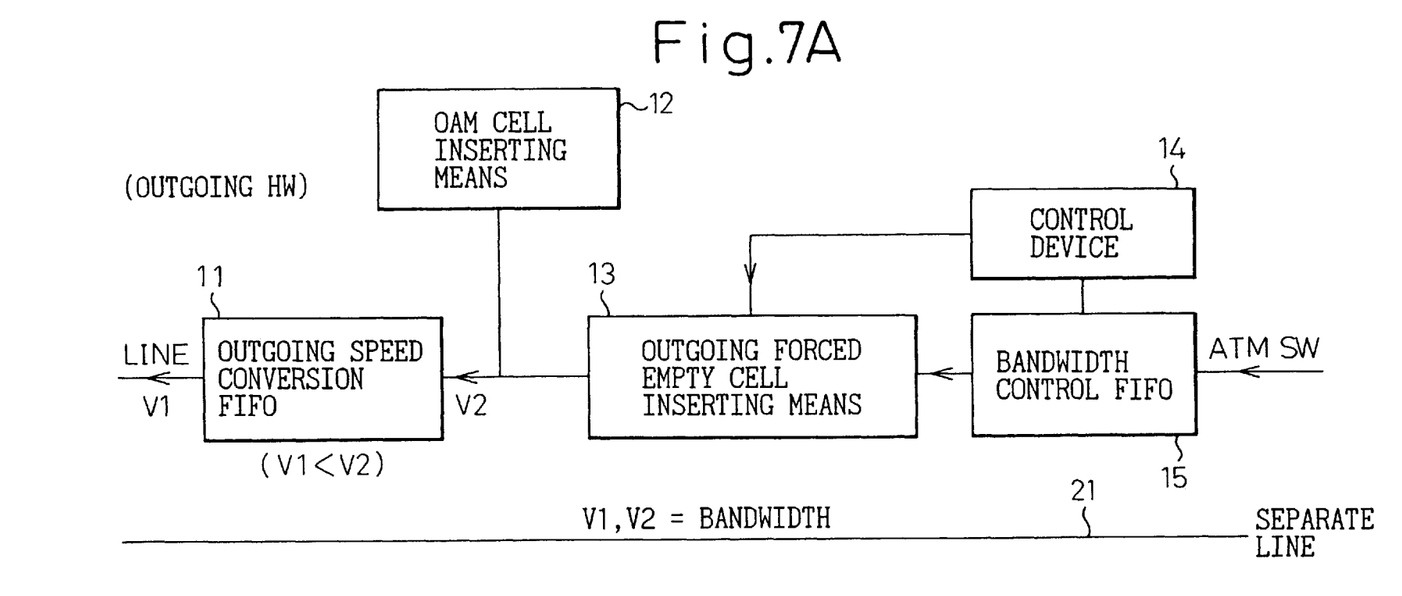
FIG. 7A is a diagram showing a cell bandwidth control apparatus according to a second embodiment of the present invention.

FIG. 7A shows a cell bandwidth control apparatus for inserting forced empty cells for cell bandwidth control according to a second embodiment of the present invention.

Figure 7B:
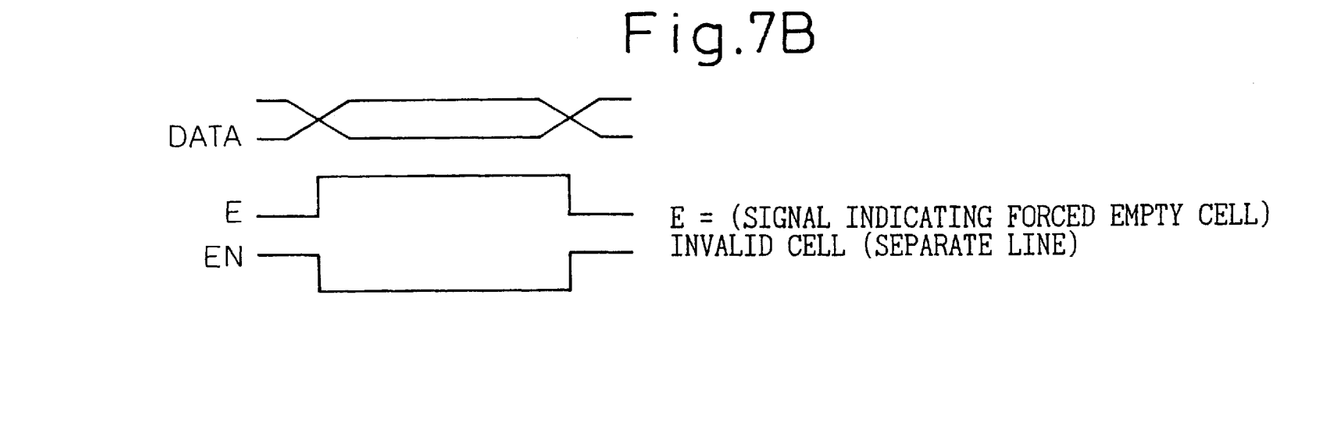
FIG. 7B is a diagram showing an example of a forced empty cell signal in FIG. 7A.

FIG. 7B shows one example of a signal indicating a forced empty cell.

The configuration shown in FIG. 7A is fundamentally the same as that of FIG. 5A, except that in FIG. 7A, a timing signal (FIG. 7B) indicating a forced empty cell is given using a separate line, in place of or in addition to the forced empty cell indication E bit in the tag field.

In FIG. 7A, as in FIG. 5A, if there is an empty space in the bandwidth control FIFO 15, a forced empty cell is inserted in a cell slot in the out-of-band area where user cells, etc. for transmission are not carried. At the same time, the signal indicating a forced empty cell is sent out along the separate line, as shown in FIG. 7B. Accordingly, the present embodiment is particularly effective when the forced empty cell indication bit cannot be assigned to the tag, or when detecting or counting forced empty cells in a simplistic way.

Figure 8:
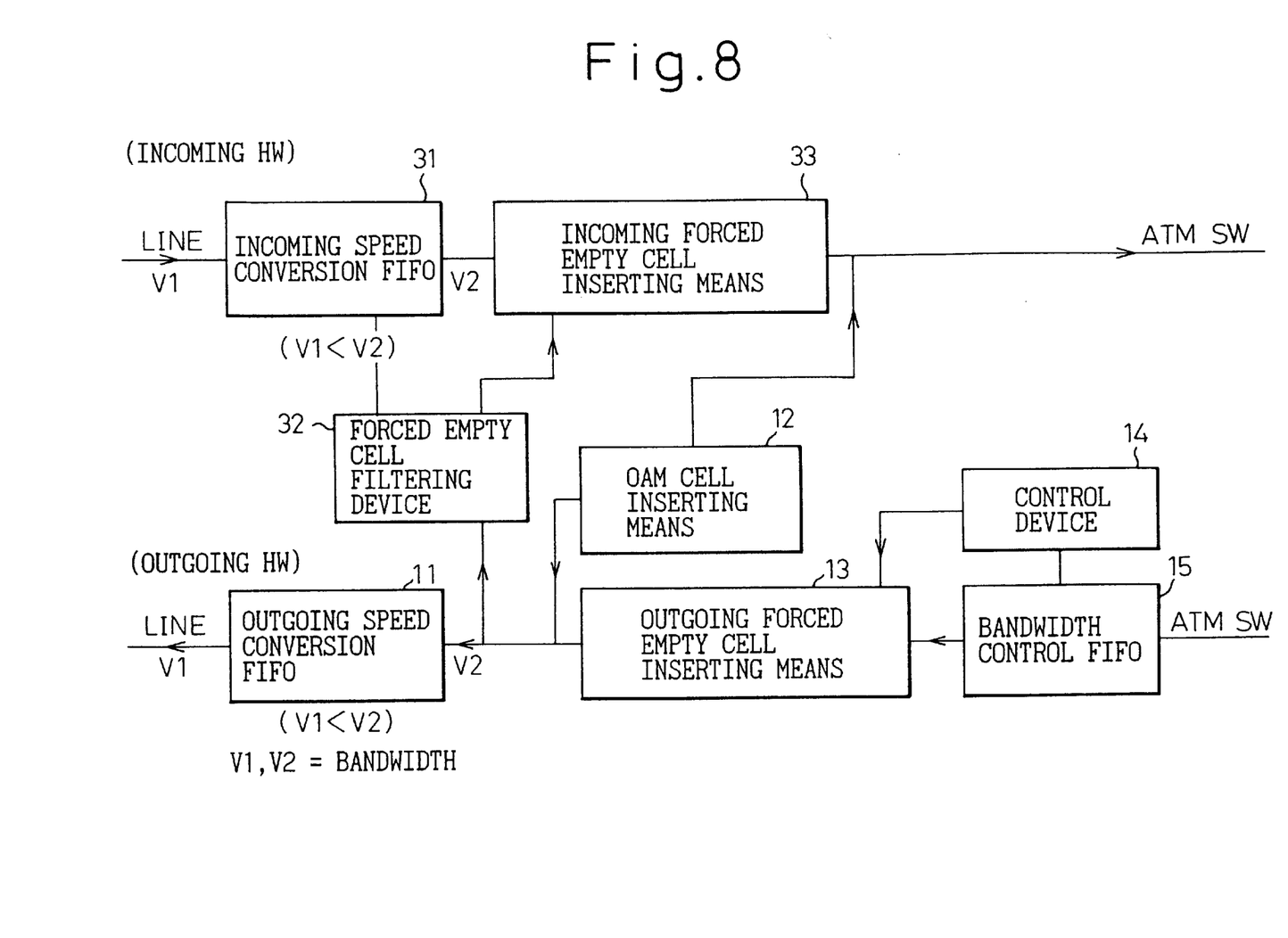
FIG. 8 is a diagram showing a cell bandwidth control apparatus according to a third embodiment of the present invention.

FIG. 8 shows a cell bandwidth control apparatus for inserting forced empty cells for cell bandwidth control according to a third embodiment of the present invention.

In FIG. 8, an incoming forced empty cell filtering device 32, an incoming speed conversion FIFO 31, and an incoming forced empty cell inserting means 33 are added to the configuration of FIG. 5A. The foregoing embodiments have dealt with examples in which bandwidth control using forced empty cells is performed on the outgoing highway. On the other hand, in the embodiments hereinafter described, including the present embodiment and up to the embodiment shown in FIG. 10, bandwidth control is also performed on the incoming highway by looping the forced empty cells on the outgoing highway directly back to the incoming highway.

In FIG. 8, the forced empty cell filtering device 32 detects the forced empty cells inserted in the outgoing highway by detecting the E bit appended to the tag or by using the separate line or the like, and filters therethrough only the forced empty cells for output to the incoming forced empty call inserting means 33. At this time, the forced empty cell filtering device 32, like the control device 14 in FIG. 5A, monitors and controls the incoming speed conversion FIFO 31 to adjust the timing for inserting the forced empty cells. In this embodiment, the counter for counting the forced empty cells as required in FIG. 6 is not needed, and the incoming forced empty cell inserting means 33 is the same in function as the outgoing forced empty cell inserting means 13 in FIG. 5A.

According to the present embodiment, since both the incoming and outgoing highways are controlled for bandwidth, the configuration is effective in applications where an apparatus requiring bandwidth limiting is connected, directly or indirectly via the exchange, not only on the outgoing highway side but also on the incoming highway side. Furthermore, by writing a highway test pattern or the like in the payload of the forced empty cell, it is possible to provide the forced empty cell with the function of testing the incoming and outgoing highways in addition to the bandwidth limiting function, as will be described in the example of FIG. 10.

Figure 9:
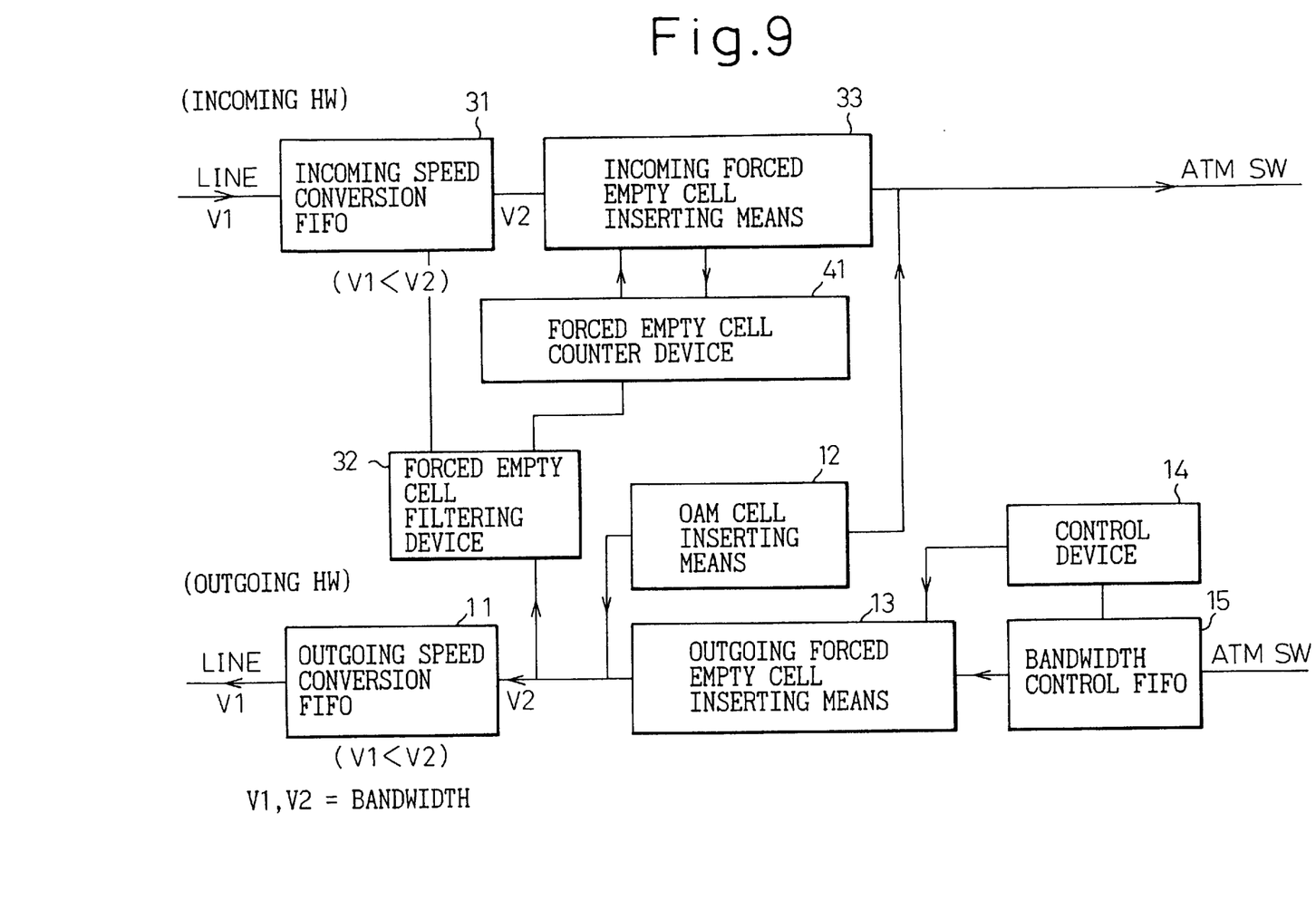
FIG. 9 is a diagram showing a cell bandwidth control apparatus according to the fourth embodiment of the present invention.

FIG. 9 shows a cell bandwidth control apparatus for inserting forced empty cells for cell bandwidth control according to a fourth embodiment of the present invention.

In FIG. 9, a forced empty cell counter device 41 is further added to the configuration of FIG. 8. In this embodiment, rather than looping the forced empty cells extracted from the outgoing highway directly back to the incoming highway as in the embodiment of FIG. 8, first the number of forced empty cells on the outgoing highway is counted by the forced empty cell counter device 41.

When inserting forced empty cells on the incoming highway, if there are user cells, etc. on the incoming highway, the forced empty cells cannot be inserted. Therefore, the forced empty cell counter device 41 counts the number of forced empty cells extracted by the forced empty cell filtering device 32 until an ordinary empty cell arrives.

When empty space becomes available on the incoming highway, the incoming forced empty cell inserting means 33 inserts on the incoming highway the forced empty cells the number of which has been counted by the forced empty cell counter device 41. In the present embodiment, it is made possible to insert the forced empty cells in the quantity counted, together or spread out in time, on the incoming highway when empty space becomes available on the incoming highway, or in appropriate time slots thereafter. This makes it possible to readily accommodate asynchrony between the incoming and outgoing highways.

Figure 10:
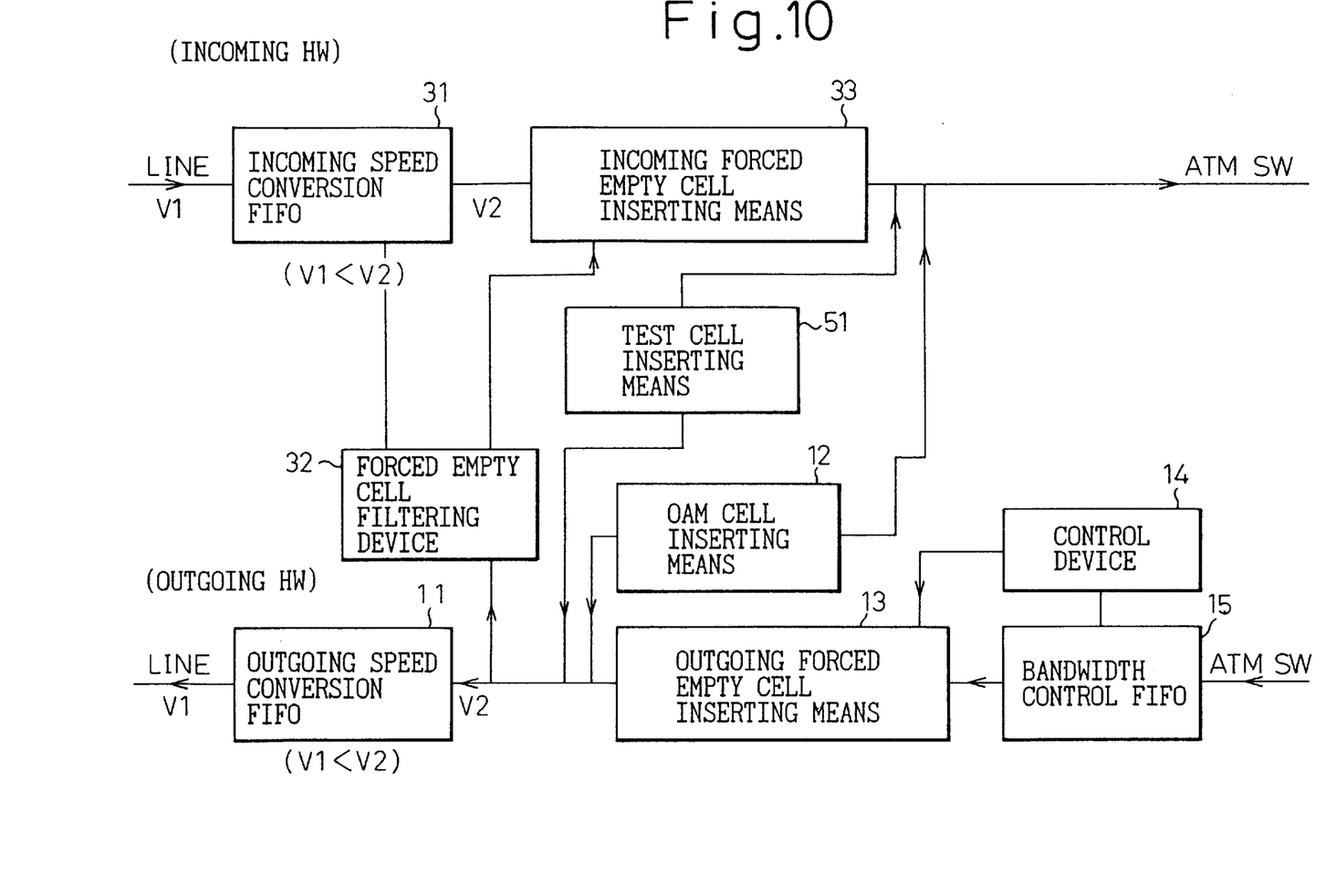
FIG. 10 is a diagram showing a cell bandwidth control apparatus according to a fifth embodiment of the present invention.

FIG. 10 shows a cell bandwidth control apparatus for inserting forced empty cells for cell bandwidth control according to a fifth embodiment of the present invention.

In this embodiment, test cell inserting means 51 is further added to the example of FIG. 8. In the foregoing embodiments, the forced empty cells have been used only for bandwidth control, but in the present embodiment, the forced empty cells are also used as test cells.

The test cell is transferred within the system to test system administration, etc. and thereby check if the system is operating properly. The test cell is also used to debug the apparatus and to check its route for proper operation.

Test cell inserting means 51 maps test data, etc. into a forced empty cell payload which is originally not intended to carry data. At the receiving end, whether the incoming and outgoing highways are operating properly can be verified by checking the test data. In this embodiment, therefore, the forced empty cell in this embodiment has the function of testing the incoming and outgoing highways in addition to the bandwidth limiting function according to the present invention.

Figure 11:
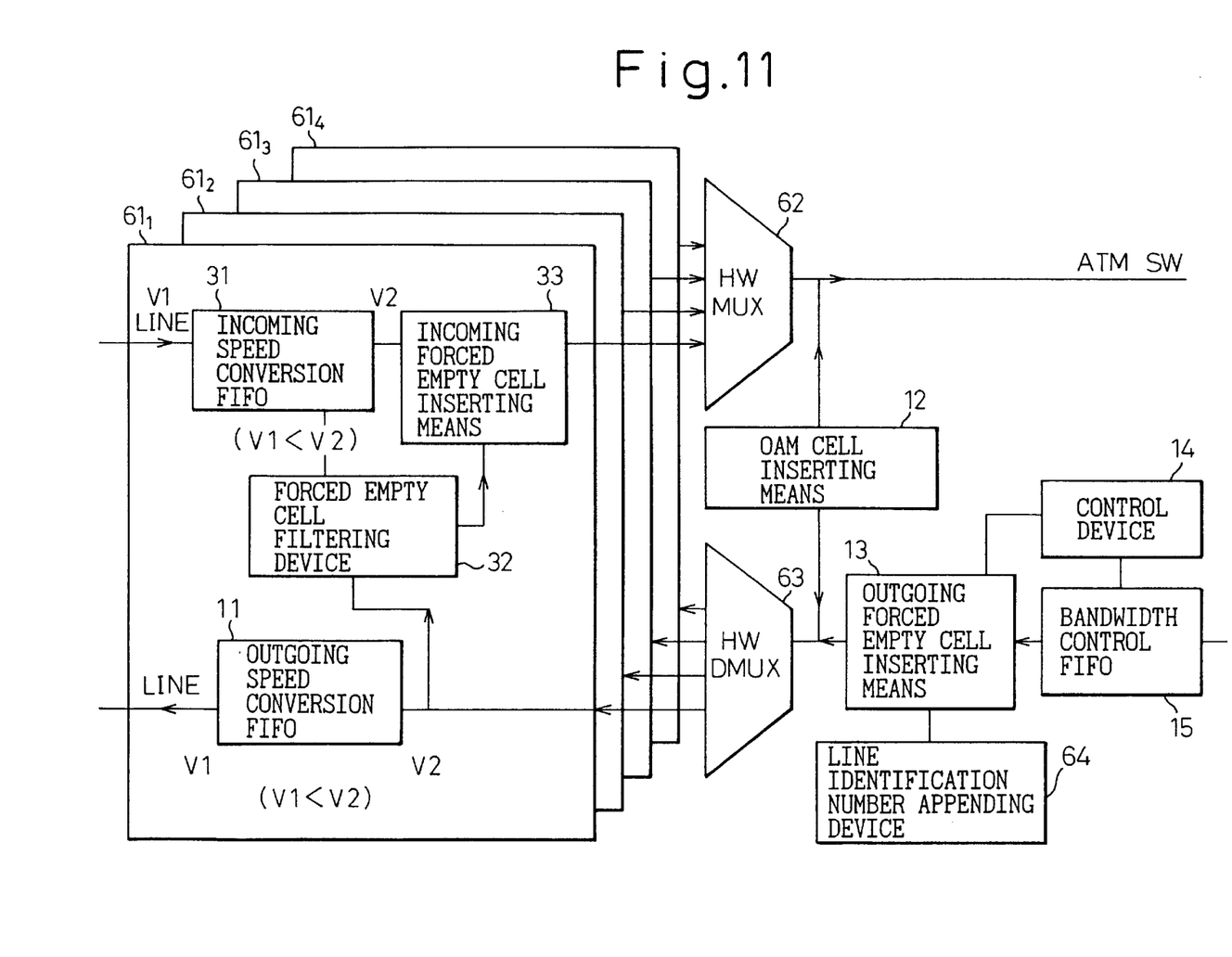
FIG. 11 is a diagram showing a cell bandwidth control apparatus according to a sixth embodiment of the present invention.

FIG. 11 shows a cell bandwidth control apparatus for inserting forced empty cells for cell bandwidth control according to a sixth embodiment of the present invention.

This embodiment concerns a configuration in which a plurality of lines multiplexed together are connected to a pair of incoming/outgoing highways accommodated in the ATM exchange.

Here, a line identifying number (TAGD) for identifying each of a plurality of line terminators, $61_1$ to $61_4$ is carried in the tag appended to a forced empty cell. In this embodiment, a line identifying number appending device 64 is provided which appends a line identifying number for identifying a forced empty cell in corresponding relationship to each of the line terminators $61_1$ to $61_4$.

An outgoing multiplexer 63 identifies each line by the line identifying number and inserts the corresponding forced empty cells for the respective line terminators $61_1$ to $61_4$. The present embodiment thus makes it possible to control forced empty cell insertion for each of the multiplexed lines. For the forced empty cells looped back from the line terminators $61_1$ to $61_4$ and output from an incoming multiplexer 62, the line can be identified also by the line identifying number carried in the tag.

As described above, with the provision of the cell bandwidth control apparatus using forced empty cells according to the present invention, user cells, OAM cells, etc. are prevented from being discarded when sending signals from the ATM exchange out onto the line side. The cell bandwidth control apparatus can also be used to prevent user cells, OAM cells, etc. from being discarded when performing ATM communications between apparatuses having different line bandwidths.

It is also made possible to perform a system test by using the payload of the bandwidth control forced empty cell. Furthermore, for a plurality of lines multiplexed together, bandwidth control can be performed for each line by using the bandwidth control forced empty cell.

What is claimed is:

1. A cell bandwidth control apparatus that is connected to an output highway of an ATM switch converts a transmission speed of data on the output highway to the speed of the input line side, and transmits the converted data to a line, comprising:

forced empty cell inserting means for inserting a forced empty cell into the output highway to fill out the excess portion of a bandwidth of the outgoing highway over an effective bandwidth within the ATM exchange; and OAM cell inserting means for inserting an OAM cell into the other portion of the bandwidth unused by the forced empty cell said forced empty cell inserting means inserts a forced empty cell in an outgoing highway leading from said ATM switch to said line adapter, thereby limiting the line bandwidth of said outgoing highway to within the bandwidth of said line accommodated in said line adapter.

2. A cell bandwidth control apparatus according to claim 1, further comprising a separate line for inserting a control signal on the line side in place of an indication flag of the forced empty cell.

3. A cell bandwidth control apparatus according to claim 1, wherein said forced empty cell carries a prescribed forced empty cell indication flag within its tag and is distinguished from other cells by said forced empty cell indication flag.

4. A cell bandwidth with control apparatus for performing bandwidth control for ATM cells transferred between an ATM exchange and a line adapter accommodating a line, comprising:

forced empty cell inserting means for forcibly inserting an empty cell in a highway connected to an ATM switch and said ATM exchange, wherein said forced empty cell inserting means inserts a forced empty cell in an outgoing highway leading from said ATM switch to said line adapter, thereby limiting the line bandwidth of said outgoing highway to within the bandwidth of said line accommodated in said line adapter, said forced empty cell carries a prescribed forced empty cell identification flag within its tag and is distinguished from other cells by said forced empty cell identification flag, wherein a separate line for forced empty cell identification is provided in place of said prescribed forced empty cell identification flag for identifying said forced empty cell, and said forced empty cell is distinguished from other cells by a forced empty cell identification signal from said separate line.

5. A cell bandwidth control apparatus for performing bandwidth control for ATM cells transferred between an ATM exchange and a line adapter accommodating a line, comprising:

forced empty cell inserting means for forcibly inserting an empty cell in a highway connected to an ATM switch in said ATM exchange, said forced empty cell inserting means inserts a forced empty cell in an outgoing highway leading from said ATM switch to said line adapter, thereby limiting the line bandwidth of said outgoing highway to within the bandwidth of said line accommodated in said line adapter; and including test cell inserting means for mapping test data into a payload area of said forced empty cell, thereby providing said forced empty cell with a line test function.

6. A cell bandwidth control apparatus for performing bandwidth control for ATM cells transferred between an ATM exchange and a line adapter accommodating a line, comprising:

forced empty cell inserting means for forcibly inserting an empty cell in a highway connected to an ATM switch in said ATM exchange, said forced empty cell inserting means inserts a forced empty cell in an outgoing highway leading from ATM switch to said line adapter, thereby limiting the line bandwidth of said outgoing highway to within the bandwidth of said line accommodated in said line adapter; and forced empty cell filtering device for extracting only a forced empty cell on said outgoing highway, wherein the forced empty cell extracted by said forced empty cell filtering device is directly looped back by said forced empty cell inserting means for insertion into an incoming highway leading from said line adapter to said ATM switch, thereby limiting the line bandwidth of said incoming highway to within the bandwidth of the line accommodated in said line adapter.

7. A cell bandwidth control apparatus according to claim 6, wherein said forced empty cell carries a prescribed forced empty cell indication flag within its tag and is distinguished from other cells by said forced empty cell indication flag.

8. A cell bandwidth control apparatus according to claim 7, wherein a separate line for forced empty cell identification is provided in place of said prescribed forced empty cell indication flag for identifying said forced empty cell, and said forced empty cell is distinguished from other cells by a forced empty cell identification signal from said separate line.

9. A cell bandwidth control apparatus according to claim 6, including test cell inserting means for mapping test data into a payload area of said forced empty cell, thereby providing said forced empty cell with a line test function.

10. A cell bandwidth control apparatus according to claim 6, further including a counter for counting the number of forced empty cells detected on said outgoing highway by said forced empty cell filtering device, wherein said forced empty cell inserting means successively inserts forced empty cells in the number counted by said counter into said incoming highway rather than directly looping back said detected forced empty cells on said outgoing highway for insertion into said incoming highway.

11. A cell bandwidth control apparatus according to claim 10, wherein each of said forced empty cells carries a prescribed forced empty cell indication flag within its tag and said forced empty cells are distinguished from other cells by said forced empty cell indication flag.

12. A cell bandwidth control apparatus according to claim 11, wherein a separate line for forced empty cell identification is provided in place of said prescribed forced empty cell indication flag for identifying said forced empty cells, and said forced empty cells are distinguished from other cells by a forced empty cell identification signal from said separate line.

13. A cell bandwidth control apparatus according to claim 10, including test cell inserting means for mapping test data into a payload area of each of said forced empty cells, thereby providing said forced empty cells with a line test function.

14. A cell bandwidth control apparatus according to claim 1, further including a line identification number device for adding a line identification number within a tag of said forced empty cell when said line adapter is multiplexed to accommodate a plurality of lines on a single highway, wherein control for forced empty cell insertion is carried out for each of said lines by said line identification number device.

15. A cell bandwidth control apparatus according to claim 14, wherein said forced empty cell carries a prescribed forced empty cell indication flag within its tag and is distinguished from other cells by said forced empty cell indication flag.

16. A cell bandwidth control apparatus according to claim 15, wherein a separate line for forced empty cell identification is provided in place of said prescribed forced empty cell indication flag for identifying said forced empty cell, and said forced empty cell is distinguished from other cells by a forced empty cell identification signal from said separate line.

17. A cell bandwidth control apparatus according to claim 14, including test cell inserting means for mapping test data into a payload area of said forced empty cell, thereby providing said forced empty cell with a line test function.

18. A cell bandwidth control apparatus for limiting a communication bandwidth in ATM communications, on the side of an ATM communication apparatus having a larger communication bandwidth comprising: forced empty cell inserting means for inserting a forced empty cell into a bandwidth of the ATM communication apparatus having the larger communication bandwidth to fill out the excess portion of a bandwidth of the other ATM communication apparatus having a smaller communication bandwidth; and OAM cell inserting means for inserting an OAM cell into the other portion of the bandwidth unused by the forced empty cell.

19. A cell bandwidth control apparatus that is connected to the input and output highways of an ATM switch, and converts a data transmission speed between the input and output highways, comprising:

forced empty cell inserting means for inserting a forced empty cell into the output highway to fill out the excess portion of a bandwidth of the output highway over an effective bandwidth within the ATM exchange;

OAM cell inserting means for inserting an OAM cell into the other portion of the bandwidth unused by the forced empty cell; and input highway inserting means for extracting a forced empty cell from the output highway and inserting the extracted forced empty cell into the input highway.

* * * * *